United States Patent Office 3,278,306
Patented Oct. 11, 1966

3,278,306
COLOUR COUPLERS AND THEIR PRODUCTION AND USE IN COLOUR PHOTOGRAPHY
Colin William Greenhalgh, Manchester, England, assignor to Ilford Limited, Essex, England, a British company
No Drawing. Filed May 27, 1963, Ser. No. 283,566
Claims priority, application Great Britain, Aug. 29, 1960, 29,756/60
4 Claims. (Cl. 96—55)

This application is a continuation-in-part of applications Serial No. 75,081, filed December 12, 1960, now U.S. Patent No. 3,161,512, and Serial No. 131,114, filed August 14, 1961, now abandoned.

This invention relates to colour couplers and to their production and use in colour photography.

Many modern processes of colour photography are based on the development of developable silver salt photographic image by means of an aromatic primary amino compound, such as an N,N-diethyl p-phenylene diamine or a derivative thereof in the presence of a so-called colour coupler this being a compound which will couple with the oxidation products of the developer to yield a dye image, usually an azomethine or quinone-imine dye image, in situ with the developed silver.

Where, as in many of the processes, the colour coupler is incorporated in the photographic emulsion layer in which the image is ultimately to be formed, it is important that it should be non-diffusing in such layer, i.e. that it should neither diffuse away during the processing steps nor migrate from its layer to any adjacent layer. Many attempts have been made to achieve this characteristic of non-diffusibility, i.e. to make the colour coupler substantive to the medium, usually gelatin, of the photographic emulsion. The methods which have been employed consist generally in the use of colour couplers containing groups of substantial molecular size, e.g. long chain alkyl groups, and also solubilising groups. Such colour couplers are often manufactured by a synthesis which involves several stages and the colour couplers are often difficult to isolate and purify. It is one object of the present invention to provide a new class of colour couplers which are non-diffusing in photographic emulsion layers, and which may be manufactured by a simple synthetic process and may readily be isolated and purified.

According to a first feature of the present invention there is provided, as a new class of colour couplers, compounds of the general Formula I:

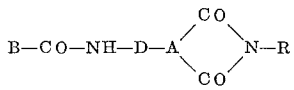
(I)

wherein A is a trivalent radical selected from

and

B—CO—NH— is a residue selected from the class consisting of aroylacetic acid amino, 1-phenol-2-carboxylic acid amido and 1-naphthol-2-carboxylic acid amido, D is a direct linkage, or

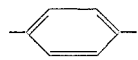

or

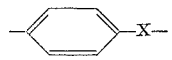

linkage where X is —S—, —SO₂— or —CONH—, and R is a hydrocarbon or substituted hydrocarbon group, e.g. alkyl, aryl, aralkyl or cycloalkyl.

The groups B—CO—NH— are each a "colour coupler residue" and have the common feature that the compound

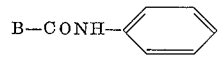

is a compound which will react with the oxidation products of N,N-diethyl p-phenylene diamine, formed during the development of a silver salt image with that compound, to yield a quinone-imine or azomethine dyestuff.

According to a further feature of this invention, colour couplers of the general Formula I are prepared by condensing a compound of the general Formula II:

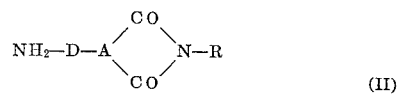
(II)

wherein A, D and R have the meanings assigned to them above, with a compound of the general Formula III:

B—CO—Y   (III)

where B— has the meaning assigned to it above and Y is a halogen atom or a group—OM where M is lower alkyl or phenyl.

The compounds of the general formula B—CO—Y which may be used in the process of the invention are, for example:

(1) Ethyl benzoylacetate, ethyl 4-methoxybenzoylacetate, ethyl 2-methoxybenoylacetate, ethyl 4-N-dimethylaminobenzoylacetate and ethyl (2-methyl-2:3-dihydrobenzofuran-7-yl-carbonyl)acetate. Such compounds, when used in the process of the invention, yield colour couplers which give yellow dyestuffs on colour development with substituted p-phenylenediamines.

(2) Phenyl salicylate, phenyl 1-hydroxy-2-naphthoate, and phenyl 1-hydroxy-4-chloro-2-naphthoate, which give colour couplers yielding cyan dyestuffs on colour development with substituted p-phenylenediamines.

According to a further feature of the present invention, a process for the production of a photographic colour image in a photographic element comprises developing a developable silver salt image present in said element by means of a substituted p-phenylene diamine colour developer in the presence of a colour coupler of the general Formula I.

The new colour couplers of the invention may be used in the developing solution or they may be included in a light-sensitive layer or in a non-light-sensitive layer adjacent to a sensitive layer or separated therefrom by a water-permeable colloid layer.

It is a preferred feature of the invention to include the new colour couplers of the invetion in a light-sensitive gelatino- or gelatino-substituted silver halide emulsion layer which forms part of a multilayer film or paper of the kind used for colour photography.

According to a further feature of the invention, therefore, there is provided a photographic material comprising three layers of silver halide photographic emulsion respectively sensitive to the blue, green and red regions of the spectrum, each containing a colour coupler, at least one of said colour couplers being a colour coupler of general Formula I.

The multilayer colour photographic material may be a natural order material in which the images are to be formed in colours complementary to those of the original object, or one in which an unnatural order is used, for example one in which in the top layer there is formed a yellow image of the blue parts of the object, in one of the two layers there is formed a cyan image of the green parts of the object, and in the other a magenta image of the red parts of the object.

The new colour couplers may be incorporated in the photographic emulsion layers by taking them up in dilute alkali, e.g. dilute sodium hydroxide, and adding the resulting solution to the emulsion. The alkali has the effect of opening the ring structure:

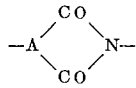

to afford a free carboxylic group imparting solubility to the compound. Alternatively, the new colour couplers may be dispersed without ring opening, for example in a non-solvent medium, and the dispersion added to the photographic emulsion.

The following examples will serve to illustrate the invention:

EXAMPLE 1

*1-hydroxy-2-N-(N-n-dodecyl-3:4-phthalimide) naphthamide*

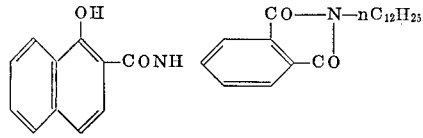

A mixture of 13.2 parts of phenyl-1-hydroxy-2-naphthoate and 16.5 parts of 4-amino-N-n-dodecylphthalimide is heated at 160–170° C. and 12 mm. pressure until no more phenol distils (approx. 1½ hours). After cooling, the solid reaction product is triturated with methanol, filtered off, washed with methanol and then recrystallised from ethyl acetate. The 16.2 parts of 1-hydroxy-2-N-(N-n-dodecyl-3:4-phthalimide)-naphthamide is obtained as cream coloured crystals melting at 164–165° C. and on analysis is found to contain 74.5% of carbon, 7.1% of hydrogen and 5.7% of nitrogen ($C_{31}H_{36}O_4N_2$ requires 74.4% of carbon, 7.2% of hydrogen and 5.6% of nitrogen).

The 4-amino-N-n-dodecylphthalimide itself may be obtained as follows:

55.5 parts of n-dodecylamine are added to a hot solution of 57.9 parts of 4-nitrophthalic anhydride in 120 parts of acetic acid and the solution obtained heated under reflux for 1 hour. After cooling the colourless crystalline product is filtered off, washed with methanol and dried to give 76 parts of 4-nitro-N-n-dodecylphthalimide melting at 86–88° C. The nitro compound in 1000 parts of ethyl acetate is then hydrogenated under pressure at 60–70° C. for 6 hours using Raney nickel as catalyst and the crude amine so obtained recrystallised from methanol. The 4-amino-N-n-dodecylphthalimide is obtained as lemon yellow crystals melting at 68–70° C. and on analysis is found to contain 72.8% of carbon, 8.9% of hydrogen and 8.4% of nitrogen ($C_{20}H_{30}O_2N_2$ requires 72.7% of carbon, 9.1% of hydrogen and 8.5% of nitrogen).

A photographic emulsion layer containing the colour coupler may be obtained in the following manner:

6.0 parts of 2 N potassium hydroxide solution are added to a suspension of 2.84 parts of the colour coupler in 33 parts of n-propanol. On warming a solution is obtained which is then diluted to 67 parts with distilled water. The colour coupler solution is added to 540 parts of a red sensitised gelatin silver halide emulsion and the emulsion coated on to a film base and the coated layer dried. When the photographic material so obtained is exposed to red light, developed in a colour developer containing 4-amino-N-ethyl-N-ε-hydroxy pentylaniline, bleached and fixed, a cyan dye image is obtained which has an absorption maximum at a wavelength of light of 685 millimicrons.

EXAMPLE 2

*1-hydroxy-2-N-(N-n-octadecyl-3:4-phthalimide) naphthamide*

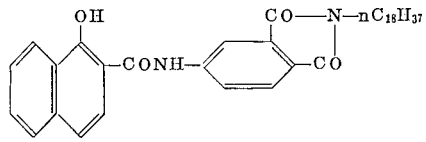

In place of the 16.5 parts of 4-amino-N-n-dodecylphthalimide used in Example 1 there are used 20.7 parts of 4-amino-N-n-octadecylphthalimide. The colour coupler is recrystallised from dioxan and is obtained as cream coloured crystals melting at 154–156° C. On analysis the colour coupler is found to contain 75.7% of carbon, 8.1% of hydrogen and 5.0% of nitrogen ($C_{37}H_{48}O_4N_2$ requires 76.1% carbon, 8.2% hydrogen and 5.0% nitrogen).

The 4-amino-N-n-octadecylphthalimide itself may be obtained in a similar manner to 4-amino-N-n-dodecylphthalimide described in Example 1 but using 80.7 parts of n-octadecylamine in place of 55.5 parts of n-dodecylamine. The intermediate, 4-nitro-N-n-octadecylphthalimide, is obtained as colourless plate crystals melting at 92–94° C. and the 4-amino-N-n-octadecylphthalimide as lemon yellow crystals melting at 92–94° C.

A photographic emulsion layer containing the colour coupler may be obtained in a similar manner to that described in Example 1 but using 3.32 parts of colour coupler in place of the 2.84 parts of the colour coupler of Example 1. When the photographic material so obtained is exposed and processed as described in Example 1, a cyan dye image having an absorption maximum at 685 millimicrons is obtained.

Alternatively, the colour coupler may be treated to open the phthalimide ring and the product isolated prior to the preparation of the coating solution. This may be done in the following manner:

50 parts of a 2 N solution of potassium hydroxide are added to a warm suspension of 20 parts of the colour coupler in 150 parts of n-propanol, and the mixture heated to the boil. A solution is obtained which is initially orange in colour, but slowly goes colourless. The solution is cooled, acidified with acetic acid and the precipitated colour coupler filtered off, washed with water and dried. The colour coupler, which consists of 1-hydroxy-2 - N - (3 - n - octadecylaminocarbonyl - 4 - carboxybenzoyl)-naphthamide or 1-hydroxy-2-N-(3-carboxy-4-n-octadecylaminocarbonylbenzoyl)naphthamide, melts with decomposition at 174° C.

The colour coupler is incorporated in a photographic emulsion in the manner used for the parent colour coupler.

EXAMPLE 3

*4-(4'-methoxybenzoylacetamido)-N-n-dodecylphthalimide*

20 parts of xylene are distilled from a boiling solution of 16.5 parts of 4-amino-N-n-dodecylphthalimide in 150 parts of xylene. A solution of 20 parts of ethyl anisoyl acetate in 30 parts of xylene containing 0.2 part of pyridine is then added over a period of 10 minutes. The ethanol liberated during the reaction is distilled off together with 50 parts of xylene. The reaction mixture is then heated under reflux for ¾ hour, cooled and the crystalline colour coupler filtered off, washed with benzene and then with a petroleum fraction boiling between 60 and 80° C. The product so obtained melting at 155–157° C. is recrystallised from 300 parts of ethyl acetate to give 20.5 parts of the colour coupler as colourless plate crystals melting at 155–157° C. On analysis the colour coupler is found to contain 71.1% of carbon, 7.3% of hydrogen and 5.6% of nitrogen ($C_{30}H_{38}O_5N_2$ requires 71.1% of carbon, 7.5% of hydrogen and 5.55% of nitrogen).

A photographic emulsion layer containing the colour coupler may be obtained in the following manner:

4.6 parts of 2 N potassium hydroxide solution are added to a suspension of 2.82 parts of the colour coupler in 32 parts of n-propanol. On warming a solution is obtained which is then diluted to 64 parts with distilled water. The colour coupler solution is added to 460 parts of a gelatin silver halide emulsion and the emulsion coated on to a film base and the coated layer dried. When the photographic material so obtained is exposed to blue light, developed in a colour developer containing 4-amino-N-ethyl-N-ε-hydroxypentylaniline, bleached and fixed, a yellow dye image is obtained which has an absorption maximum at a wavelength of light of 437 millimicrons.

EXAMPLE 4

*4-(4'-methoxybenzoylacetamido)-N-n-octadecylphthalimide*

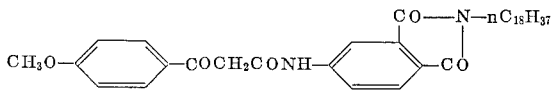

In place of the 16.5 parts of 4-amino-N-n-dodecylphthalimide used in Example 3 there are used 20.7 parts of 4-amino-N-n-octadecylphthalimide. The colour coupler is recrystallised from benzene and is obtained as colourless plate crystals melting at 147–150° C. and on analysis is found to contain 73.6% of carbon, 8.3% of hydrogen and 4.8% of nitrogen ($C_{36}H_{50}O_5N_2$ requires 73.7% of carbon, 8.55% of hydrogen and 4.1% of nitrogen).

A photographic emulsion layer containing the colour coupler may be obtained in the same manner as that described for Example 3 but using 3.26 parts of the colour coupler in place of the 2.82 parts of the coupler described in Example 3.

The yellow dye image obtained has an absorption maximum at a wavelength of light of 435 millimicrons.

EXAMPLE 5

*1-hydroxy-4-chloro-2-N-(N-n-octadecyl-3:4-phthalimide)naphthamide*

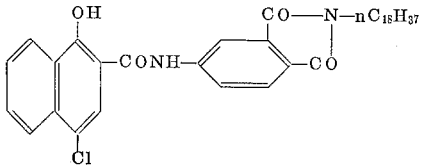

A mixture of 7.49 parts of phenyl 1-hydroxy-4-chloro-2-naphthoate and 10.35 parts of 4-amino-N-n-octadecylphthalimide is heated at 160–170° C. and 12 mm. pressure until no more phenol distils (approx. 1½ hours). After cooling, the reaction product is triturated with methanol, filtered, washed with methanol, then diethyl ether, and thrice recrystallised from ethyl acetate. The colour coupler, which consists of 1-hydroxy-4-chloro-2-N(N-n-octadecyl-3:4-phthalimido)naphthamide, is obtained as cream coloured flocculent crystals melting at 175–177° C., and on analysis is found to contain 4.6% nitrogen and 6.0% chlorine ($C_{37}H_{47}O_4N_2Cl$ requires 4.5% of nitrogen and 5.75% of chlorine).

A photographic layer containing the colour coupler may be obtained in a similar manner to that described in Example 1, but using 3.5 parts of colour coupler in place of the 2.84 parts of the colour coupler on Example 1.

When the photographic layer so obtained is exposed and processed in the manner described in Example 1, a cyan dye image having an absorption maximum of 671 millimicrons is obtained.

EXAMPLE 6

*1-hydroxy-2-N-[4-phenylsuccin-N-(4-n-dodecylphenyl)imide]naphthamide*

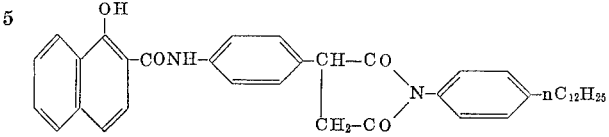

In place of the 16.5 parts of 4-amino-N-n-dodecylphthalimide used in Example 1 there are used 21.7 parts of 4-aminophenylsuccin-N-(4-n-dodecylphenyl)imide. Recrystallisation first from n-butyl acetate and then from ethyl acetate gives the colour coupler as pale cream crystals melting at 205–206° C.

On analysis the colour coupler is found to contain 77.0% of carbon, 7.2% of hydrogen and 4.3% of nitrogen ($C_{39}H_{44}O_4N_2$ requires 77.5% of carbon, 7.3% of hydrogen and 4.65% of nitrogen).

The 4-aminophenylsuccin-N-(4-n-dodecylphenyl)imide itself may be obtained in the following manner:

30 parts of 4-nitrophenylsuccin-N-(4-n-dodecylphenyl)imide in 150 parts of ethyl acetate is hydrogenated under pressure at 60° C. for 6 hours using Raney nickel as catalyst. The amine obtained is recrystallised from methanol when it is obtained as colourless crystals melting at 122° C.

The 4-nitrophenylsuccin-N-(4-n-dodecylphenyl)imide itself is obtained as follows:

A mixture of 23.9 parts of 4-nitrophenylsuccinic acid and 26.1 parts of 4-n-dodecylaniline is stirred and heated at 160–170° C. for ¾ hour. After cooling the residue is dissolved in diethyl ether and the solution left to crystallise. The product is filtered off, washed with diethyl ether and dried to give the nitro compound as colourless crystals melting at 110–112° C., which on analysis is found to contain 72.5% of carbon, 7.8% of hydrogen and 5.7% of nitrogen ($C_{28}H_{36}O_4N_2$ requires 72.4% of carbon, 7.75% of hydrogen and 6.05% of nitrogen).

A photographic emulsion layer containing the colour coupler may be obtained in a similar manner to that described in Example 1 but using 3.49 parts of colour coupler. When the photographic material so obtained is exposed and processed as described in Example 1 a cyan dye image having an absorption maximum above 700 millimicrons is obtained.

EXAMPLE 7

*1-hydroxy-2-N-[N(4-n-dodecylphenyl)-3:4-phthalimide]naphthamide*

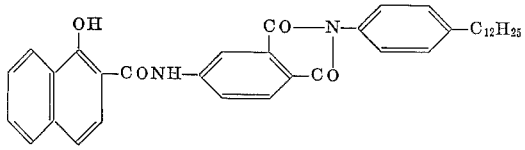

In place of the 16.5 parts of 4-amino-N-n-didecylphthalimide used in Example 1 there are used 20.3 parts of 4-amino-N-(4-n-dodecylphenyl)phthalimide. The colour coupler is twice recrystallised from dioxan when it is obtained as colourless crystals melting at 240–244° C. On analysis the colour coupler is found to contain 76.9% of carbon, 6.8% of hydrogen and 5.0% of nitrogen ($C_{37}H_{40}O_4N_2$ requires 77.1% of carbon, 6.95% of hydrogen and 4.85% of nitrogen).

The 4-amino-N-(4-n-dodecylphenyl)phthalimide used in the above example may be prepared in the following manner:

A mixture of 26.1 parts of 4-n-dodecylaniline and 21.1 parts of 4-nitrophthalic acid is stirred and heated at 180° C. for 1½ hours. After cooling the residue is twice recrystallised from ethyl acetate to give 4-nitro-N-(4-n-dodecylphenyl)phthalimide as colourless plate crystals melting at 128–130° C. The 26 parts of nitro compound so obtained are hydrogenated under pressure at 60° C. for 6 hours in 200 parts of ethyl acetate using Raney nickel as catalyst. The amine obtained is recrystallised from n-propanol when it is obtained as yellow crystals melting at 144–146° C. On analysis the amine is found to contain 76.7% of carbon, 8.35% of hydrogen and 7.1% of nitrogen ($C_{26}H_{34}O_2N_2$ requires 76.9% of carbon, 8.35% of hydrogen and 6.9% of nitrogen).

A photographic emulsion layer containing the colour coupler may be obtained by the method given in Example 1 but using 3.34 parts of colour coupler. When the photographic material so obtained is exposed and processed as described in Example 1 a cyan dye image is obtained which has an absorption maximum at 690 millimicrons.

EXAMPLE 8

*1-hydroxy-2-N-[4-n-octadecyl-3:4-phthalimide) aminocarbonylphenyl]-2-naphthamide*

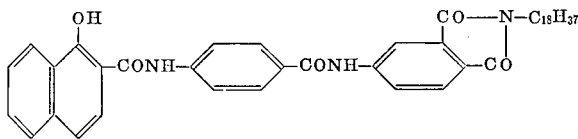

In place of 16.5 parts of 4-amino-N-n-dodecylphthalimide used in Example 1 there are used 26.6 parts of 4-(4-aminobenzoylamino)-N-n-octadecylphthalimide. The colour coupler is twice recrystallised from n-butyl acetate when it is obtained as colourless crystals melting at 238–240° C. On analysis the colour coupler is found to contain 74.8% of carbon, 7.6% of hydrogen and 6.0% of nitrogen ($C_{44}H_{53}O_5N_3$ requires 75.1% of carbon, 7.55% of hydrogen and 6.0% of nitrogen).

The 4-(4-amino benzoyl amino)-N-n-octadecylphthalimide used in the above example may be prepared in the following manner:

32 parts of 4-amino-N-n-octadecylphthalimide and 6.6 parts of anhydrous sodium acetate are dissolved in 150 parts of acetic acid. 15.2 parts of 4-nitrobenzoylchloride are then added and the mixture heated at 95–100°C. for 1½ hours. The reaction mixture is filtered and the cooled filtrate diluted with 60 parts of diethyl ether. The precipitated crystalline product is filtered off, washed with methanol and twice recrystallised from ethyl acetate to give 4-(4-nitrobenzoylamino) - N-n-octadecylphthalimide melting at 124-126 C.

The nitro compound in 500 parts of ethyl acetate is hydrogenated at 60° C. under pressure using Raney nickel as catalyst and the amine so obtained twice recrystallised from ethyl acetate. The amine is colourless and melts at 134–136° C.

A photographic emulsion layer containing the colour coupler may be obtained by the method described in Example 1 but using 3.92 parts of colour coupler. When the photographic material so obtained is exposed and processed as described in Example 1 a cyan dye image is obtained.

EXAMPLE 9

*1-hydroxy-2-N-[4-phenylthiosuccin-N-(4-n-dodecylphenyl)imide]naphthamide*

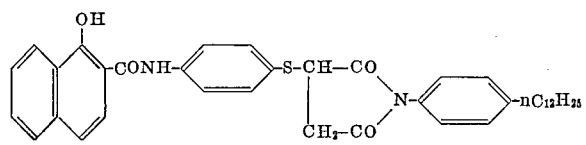

In place of the 16.5 parts of 4-amino-N-n-dodecylphthalimide used in Example 3 there are used 23.3 parts of 4-amino-phenylthiosuccin - N-(4-n-dodecylphenyl)imide. The residual oil is crystallised first from a 1:1 mixture of methanol and ethyl acetate and then from ethyl acetate when the coupler is obtained as fawn coloured crystals melting at 167–1700 C.

On analysis the colour coupler is found to contain 73.8% of carbon, 6.6% of hydrogen and 4.4% of nitrogen ($C_{39}H_{44}O_4N_2S$ requires 73.6% of carbon, 6.9% of hydrogen and 4.4% of nitrogen).

The 4-aminophenylthiosuccin-N-(4-n-dodecylphenyl)-imide used in the above example may be prepared in the following manner:

A mixture of 34 parts of 4-nitrophenylthiosuccinic acid and 32.8 parts of 4-n-dodecylaniline is heated at 170–180° C. for 1 hour, and after cooling the residue is recrystallised from petroleum ether (B.P. 80–100° C.). The nitro compound so obtained melts at 98–100° C. and is hydrogenated in 500 parts of ethanol at 60° C. under pressure using Raney nickel as catalyst. The amine is obtained as a pale brown viscous oil.

A photographic emulsion layer containing the colour coupler may be obtained by the method described in Example 1 but using 3.5 parts of colour coupler. When the photographic material so obtained is exposed and processed as described in Example 1 a cyan dye image having an absorption maximum at above 700 millimicrons is obtained.

EXAMPLE 10

*4-(4-methoxybenzoylacetamido)phenylsuccin-N-(4-n-dodecylphenyl)imide*

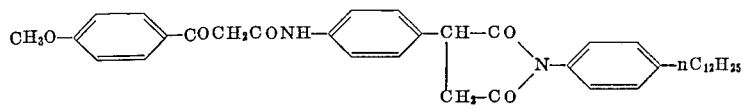

In place of the 16.5 parts of 4-amino-N-n-dodecylphthalimide used in Example 3 there are used 21.7 parts of 4-aminophenylsuccin - N-(4-n-dodecylphenyl)imide. When the reaction is completed the solution is diluted with petroleum ether (B.P. 60–80° C.) and the precipitated product filtered off, and crystallised from a mixture of acetic acid and ethyl acetate. The coupler so obtained is then heated at the boil with 100 parts of methanol, filtered, washed with methanol and dried to give colourless microcrystals melting at 184–186° C. On analysis the coupler is found to contain 74.6% of carbon, 7.2% of hydrogen and 4.5% of nitrogen ($C_{38}H_{46}O_5N_2$ requires 74.75% of carbon 7.55% of hydrogen and 4.6% of nitrogen).

A photographic emulsion layer containing the coupler may be obtained by the method given in Example 3 but using 3.38 parts of colour coupler and 4 parts of 2 N potassium hydroxide. When the photographic material so obtained is exposed and processed as described in Example 3 a yellow dye image is obtained which has an absorption maximum at 446 millimicrons.

EXAMPLE 11

*4-(benzoylacetamido)-N-n-octadecylphthalimide*

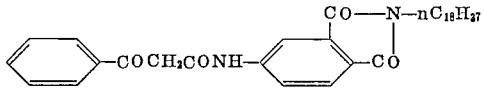

15 parts of xylene are distilled from solution of 8.28 parts of 4-amino-N-n-octadecylphthalimide in 80 parts of xylene. A solution of 4.4 parts of ethyl benzoylacetate in 10 parts of xylene containing 0.1 part of pyridine is then added over 10 minutes. The ethanol liberated during the reaction is distilled off together with 20 parts of xylene. The reaction mixture is then heated under reflux for 1 hour, cooled and the crystalline colour coupler filtered off and recrystallised from n-propanol. The colour coupler which is obtained as cream coloured crystals melts at 160–162° C. and on analysis is found to contain 75.2% of carbon, 8.8% of hydrogen and 5.0% of nitrogen ($C_{35}H_{48}O_4N_2$ requires 75.0% of carbon, 8.8% of hydrogen and 5.0% of nitrogen).

A photographic emulsion layer containing the colour coupler may be obtained by the method given in Example 3 but using 3.05 parts of colour coupler and 6.5 parts of 2 N potassium hydroxide. When the photographic material so obtained is exposed and processed as described in Example 3 a yellow dye image is obtained which has a maximum at 450 millimicrons.

EXAMPLE 12

*4-(4-phenoxybenzoylacetamindo)-N-n-octadecylphthalimide*

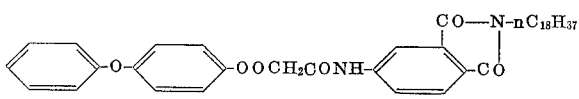

In place of the 4.4 parts of ethyl benzoylacetate used in Example 11 there are used 4.7 parts of ethyl 4-phenoxybenzoylacetate.

The colour coupler is recrystallised from n-propanol and is obtained as cream coloured crystals melting at 152–154° C. On analysis the colour coupler is found to contain 75.4% of carbon, 7.9% of hydrogen and 4.1% of nitrogen ($C_{41}H_{52}O_5N_2$ requires 75.45% of carbon, 8.0% of hydrogen and 4.3% of nitrogen).

A photographic emulsion layer containing the colour coupler may be obtained by the method given in Example 3 but using 3.55 parts of colour coupler and 6.5 parts of 2 N potassium hydroxide. When the photographic material so obtained is exposed and processed as described in Example 1 a yellow dye image having an absorption maximum at 439 millimicrons is obtained.

EXAMPLE 13

*4-(2-Ethoxybenzoylacetamido)-N-n-octadecylphthalimide*

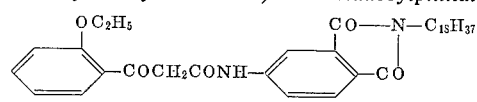

In place of the 4.4 parts of ethyl benzoylacetate used in Example 11 there are used 4.65 parts of ethyl-2-ethoxybenzoyl acetate. The colour coupler is recrystallised from n-propanol and is obtained as pale yellow crystals melting at 126–128° C. On analysis the colour coupler is found to contain 73.2% of carbon, 8.5% of hydrogen and 4.6% of nitrogen ($C_{37}H_{52}O_5N_2$ requires 73.5% of carbon, 8.6% of hydrogen and 4.65% of nitrogen).

A photographic emulsion layer containing the colour coupler may be obtained by the method given in Example 3 but using 3.3 parts of colour coupler and 6.5 parts of 2 N potassium hydroxide. When the photographic material so obtained is exposed and processed as described in Example 1 a yellow dye image having an absorption maximum at 443 millimicrons is obtained.

EXAMPLE 14

The colour former 1-hydroxy-2-N(N-n-octadecyl-3:4-phthalimide)naphthamide as prepared in Example 2 is dispersed by treatment in a ball mill as follows:

8 parts of colour former, 8 parts of Teepol (proprietary wetting agent) and 35 parts of water are mixed together and the pH of the mixture adjusted to 4.0 with hydrochloric acid. The mixture is then treated in a ball mill until the average particle size of the suspended colour former is reduced to about 1 micron.

The dispersion is then added to 1300 parts of a red sensitised gelatin silver halide emulsion and the emulsion coated on to a film base and the coated layer dried. When the photographic material so obtained is image-wise exposed to red light and developed in a colour developer containing N - hydroxy - ethyl - N - p - phenylene diamine, bleached and fixed, a cyan dye image is obtained which has an absorption maximum at a wavelength of light of 660 millimicrons.

What I claim is:

1. A process for the production of a photographic colour image in a photographic element which comprises developing a developable silver salt image present in said element by means of a substituted p-phenylene diamine colour developer in the presence of a colour coupler selected from the class consisting of colour couplers of the formula:

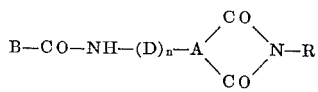

where A is a trivalent radical selected from the class consisting of

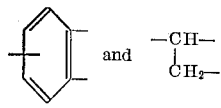

D is selected from the class consisting of

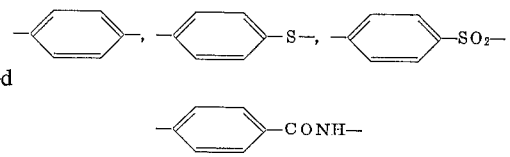

and

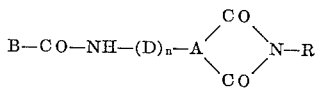

$n$ is selected from zero and one, R is an alkyl of at least 12 carbon atoms, and B—CO—NH— is a residue selected from the class consisting of aroylacetic acid amido, 1-phenol-2-carboxylic acid amido and 1-naphthol-2-carboxylic acid amido and the carboxylic acid salts obtained by treatment of said colour couplers with dilute alkali.

2. A photographic developing composition containing a substituted p-phenylene diamine colour developer and a colour coupler selected from the class consisting of colour couplers of the formula:

where A is a trivalent radical selected from the class consisting of

and

D is selected from the class consisting of

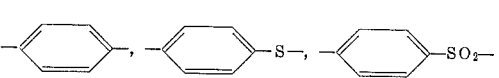

and

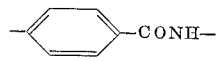

$n$ is selected from zero and one, R is an alkyl of at least 12 carbon atoms, and B—CO—NH— is a residue selected from the class consisting of aroylacetic acid amido, 1-phenol-2-carboxylic acid amido and 1-naphthol-2-carboxylic acid amido and the carboxylic acid salts obtained by treatment of said colour couplers with dilute alkali.

3. A photographic silver halide emulsion containing a colour coupler selected from the class consisting of colour couplers of the formula:

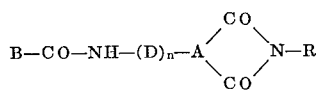

where A is a trivalent radical selected from the class consisting of

and

D is selected from the class consisting of

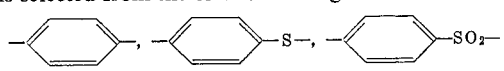

and

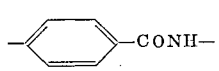

$n$ is selected from zero and one, R is an alkyl of at least 12 carbon atoms, and B—CO—NH— is a residue selected from the class consisting of aroylacetic acid amido, 1-phenol-2-carboxylic acid amido and 1-naphthol-2-carboxylic acid amido and the carboxylic acid salts obtained by treatment of said colour couplers with dilute alkali.

4. A photographic material comprising three layers of silver halide photographic emulsion respectively sensitive to the blue, green and red regions of the spectrum, each containing a colour coupler, at least one of said colour couplers being a colour coupler selected from the class consisting of colour couplers of the formula:

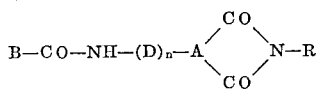

where A is a trivalent radical selected from the class consisting of

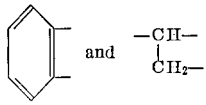

D is selected from the class consisting of

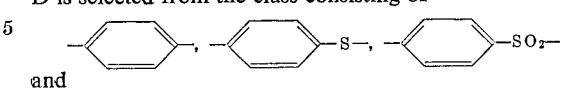

and

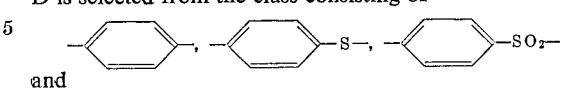

$n$ is selected from zero and one, R is an alkyl of at least 12 carbon atoms, and B—CO—NH— is a residue selected from the class consisting of aroylacetic acid amido, 1-phenol-2-carboxylic acid amido and 1-naphthol-2-carboxylic acid amido and the carboxylic acid salts obtained by treatment of said colour couplers with dilute alkali.

References Cited by the Examiner

UNITED STATES PATENTS 3,008,827  11/1961  Jaeken _____ 96—100
3,161,512  12/1964  Greenhalgh _____ 96—100

NORMAN G. TORCHIN, *Primary Examiner.*

J. TRAVIS BROWN, *Examiner.*